US012000851B2

(12) United States Patent
Tanotra et al.

(10) Patent No.: US 12,000,851 B2
(45) Date of Patent: Jun. 4, 2024

(54) LABORATORY SAMPLE DISTRIBUTION SYSTEM AND METHOD FOR OPERATING THE SAME

(71) Applicant: Roche Diagnostics Operations, Inc., Indianapolis, IN (US)

(72) Inventors: Pankaj Tanotra, Stuttgarg (DE); Michele Andruszkiewicz, Zurich (CH)

(73) Assignee: ROCHE DIAGNOSTICS OPERATIONS, INC., Indianapolis, IN (US)

(*) Notice: Subject to any disclaimer, the term of this patent is extended or adjusted under 35 U.S.C. 154(b) by 419 days.

(21) Appl. No.: 17/305,758

(22) Filed: Jul. 14, 2021

(65) Prior Publication Data

US 2022/0018868 A1 Jan. 20, 2022

(30) Foreign Application Priority Data

Jul. 15, 2020 (EP) .................................. 20185970

(51) Int. Cl.
*G01N 35/04* (2006.01)
*G01N 35/00* (2006.01)

(52) U.S. Cl.
CPC ....... *G01N 35/04* (2013.01); *G01N 35/00584* (2013.01); *G01N 2035/046* (2013.01); *G01N 2035/0477* (2013.01)

(58) Field of Classification Search
CPC .............. G01S 5/02529; G01S 5/0295; B65G 2201/0261; B65G 54/02;
(Continued)

(56) References Cited

U.S. PATENT DOCUMENTS 3,273,727 A  9/1966 Rogers et al.
3,653,485 A  4/1972 Donlon
(Continued)

FOREIGN PATENT DOCUMENTS

CN  201045617 Y  4/2008
CN  102109530 A  6/2011
(Continued)

OTHER PUBLICATIONS

Erdem, "Implementation of software-based sensor linearization algorithms on low-cost microcontrollers", ISA Transactions vol. 49, Issue 4,2010, pp. 552-558, ISSN 0019-0578,https://doi.org/10.1016/j.isatra.2010.04.004. (Year: 2010).*

(Continued)

*Primary Examiner* — Jennifer Wecker
*Assistant Examiner* — Jonathan Bortoli
(74) *Attorney, Agent, or Firm* — Woodard, Emhardt, Henry, Reeves & Wagner, LLP

(57) ABSTRACT

A laboratory sample distribution system comprising a plurality of sample container carriers, each adapted to carry one or more sample containers, each carrier comprising at least one magnetically active device and at least one electrically conductive member, a transport plane adapted to support the carriers, a plurality of electro-magnetic actuators stationary arranged below the transport plane, the actuators being adapted to move the carriers on top of the transport plane by applying a magnetic force to the carriers, a plurality of inductive sensors distributed over the transport plane, a control unit configured to control the movement of the carriers using an output signal provided by the inductive sensors by driving the actuators such that the carriers move along corresponding transport paths, and an evaluation unit configured to linearize the output signal from an inductive sensor by means of a linearization algorithm.

15 Claims, 9 Drawing Sheets

(58) Field of Classification Search
CPC ..... G01N 2035/0406; G01N 2035/046; G01N 2035/0477; G01N 2035/0494; G01N 35/00584; G01N 35/04
See application file for complete search history.

(56) References Cited

U.S. PATENT DOCUMENTS

| | | |
|---|---|---|
| 3,901,656 A | 8/1975 | Durkos et al. |
| 3,997,835 A | 12/1976 | Ando et al. |
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,672,317 A * | 9/1997 | Buhler ................. G01N 35/026 422/65 |
| 5,712,789 A * | 1/1998 | Radican ............. G06Q 10/0875 705/28 |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,366,078 B1 | 4/2002 | Irle et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 9,902,572 B2 | 2/2018 | Mahmudimanesh et al. |
| 9,939,455 B2 | 4/2018 | Schneider et al. |
| 9,952,242 B2 | 4/2018 | Riether |
| 9,969,570 B2 | 5/2018 | Heise et al. |
| 9,989,547 B2 | 6/2018 | Pedain |
| 10,006,927 B2 | 6/2018 | Sinz et al. |
| 10,012,666 B2 | 7/2018 | Riether |
| 10,031,150 B2 | 7/2018 | Heise et al. |
| 10,094,843 B2 | 10/2018 | Malinowski et al. |
| 10,119,982 B2 | 11/2018 | Baer |
| 10,126,317 B2 | 11/2018 | Heise et al. |
| 10,160,609 B2 | 12/2018 | Malinowski |
| 10,175,259 B2 | 1/2019 | Riether |
| 10,197,586 B2 | 2/2019 | Sinz et al. |
| 10,239,708 B2 | 3/2019 | Sinz |
| 10,261,103 B2 | 4/2019 | Pedain |
| 10,288,634 B2 | 5/2019 | Kaeppeli |
| 10,352,953 B2 | 7/2019 | Huber et al. |
| 10,416,183 B2 | 9/2019 | Hassan |
| 10,450,151 B2 | 10/2019 | Heise et al. |
| 10,495,657 B2 | 12/2019 | Malinowski |
| 10,509,049 B2 | 12/2019 | Sinz et al. |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Ttoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0186618 A1 | 7/2010 | King et al. |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0057668 A1 * | 3/2011 | Chen .................... G01B 7/023 324/655 |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |

(56) References Cited

U.S. PATENT DOCUMENTS

| | | |
|---|---|---|
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0234949 A1 | 8/2014 | Wasson et al. |
| 2015/0014125 A1 | 1/2015 | Hecht |
| 2015/0016937 A1* | 1/2015 | Pedain ............... B66C 1/10 414/785 |
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |
| 2015/0323694 A1* | 11/2015 | Roy ................... H02J 50/70 307/104 |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0069715 A1 | 3/2016 | Sinz |
| 2016/0229565 A1 | 8/2016 | Margner |
| 2017/0108522 A1 | 4/2017 | Baer |
| 2017/0131310 A1 | 5/2017 | Volz et al. |
| 2017/0168079 A1 | 6/2017 | Sinz |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0106821 A1 | 4/2018 | Vollenweider et al. |
| 2018/0128848 A1 | 5/2018 | Schneider et al. |
| 2018/0188280 A1 | 7/2018 | Malinowski |
| 2018/0210000 A1 | 7/2018 | van Mierlo |
| 2018/0210001 A1 | 7/2018 | Reza |
| 2018/0217174 A1* | 8/2018 | Malinowski ....... G01R 19/2513 |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |
| 2019/0316994 A1 | 10/2019 | Visinoni et al. |
| 2020/0061808 A1 | 2/2020 | Heppe et al. |
| 2020/0200783 A1 | 6/2020 | Durco |
| 2020/0400698 A1 | 12/2020 | Tafner et al. |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| EP | 2902790 A1 | 8/2015 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-104857 A | 5/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2005/012840 A1 | 2/2005 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2011/138448 A1 | 11/2011 |
| WO | 2012/158520 A1 | 11/2012 |
| WO | 2012/158541 A1 | 11/2012 |
| WO | 2013/010202 A1 | 1/2013 |
| WO | 2013/152089 A1 | 10/2013 |
| WO | 2013/169778 A1 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

OTHER PUBLICATIONS

European Search Report dated Dec. 2, 2020, in Application No. 20185970.0, 2 pp.
Gill Sensors & Controls Limited, 5 Reasons to Choose Induction Over Hall Effect Sensors, retrieved from https://www.gillsc.com/

(56) References Cited

OTHER PUBLICATIONS newsitem/45/5-reasons-choose-induction-over-hall-effect-sensors, 2014, 2 pp.
Smith, Mark, 11 Myths About Inductive Position Sensors, retrieved from https://www.electronicdesign.com/technologies/analog/article/21808705/11-myths-about-inductive-position-sensors, 2019, 13 pp.

* cited by examiner

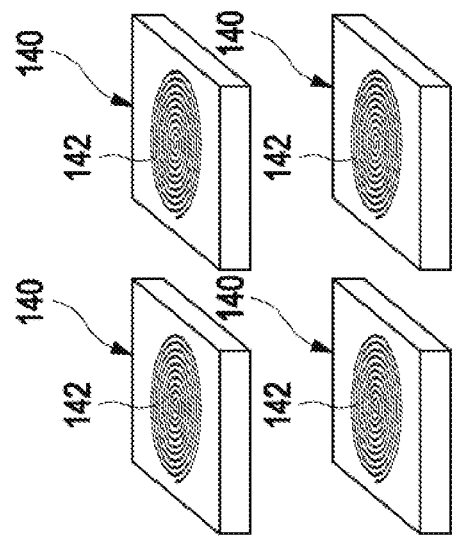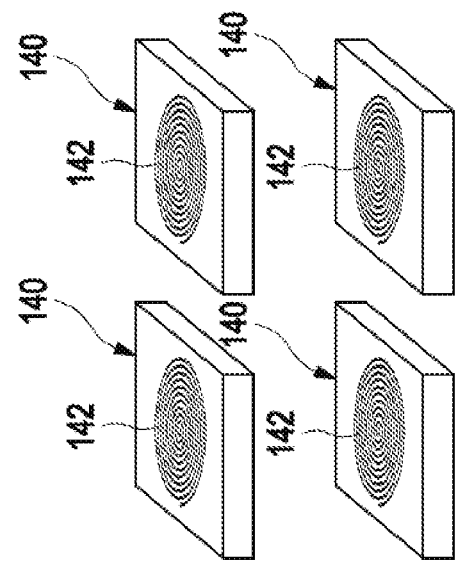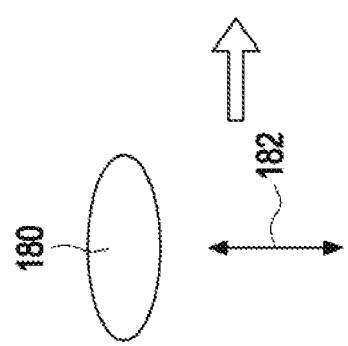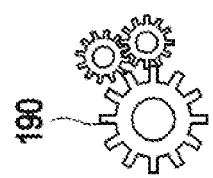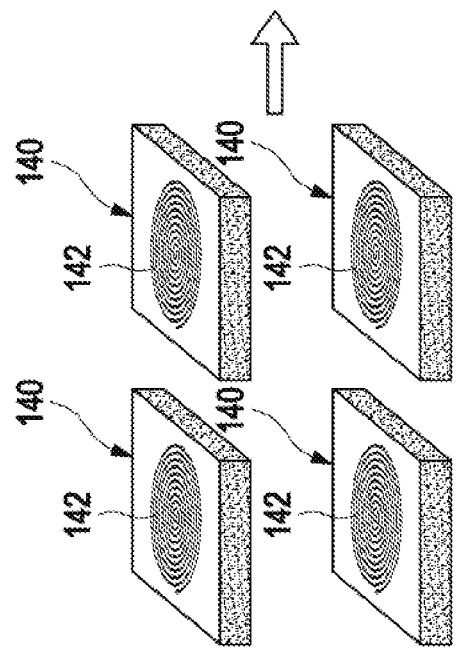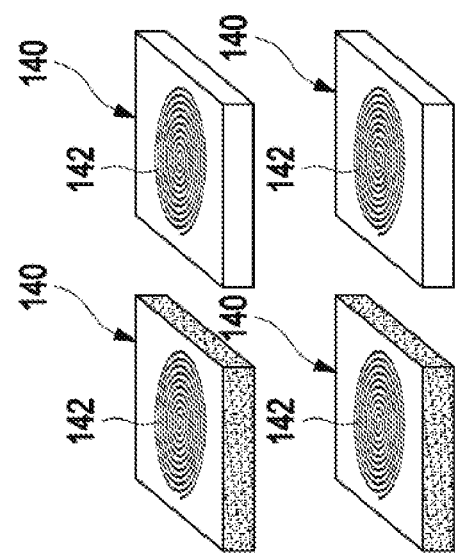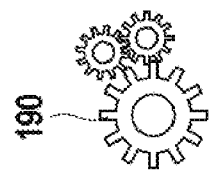
Fig. 5
Fig. 6

LABORATORY SAMPLE DISTRIBUTION SYSTEM AND METHOD FOR OPERATING THE SAME

CROSS-REFERENCE TO RELATED APPLICATIONS

This application claims priority to European Patent Application No. 20 185 970.9, filed 15 Jul. 2020, the disclosure of which is hereby incorporated by reference in its entirety.

TECHNICAL FIELD

The present disclosure relates to a laboratory sample distribution system. The present disclosure further relates to a method for operating the laboratory sample distribution system.

BACKGROUND

Laboratory sample distribution systems are used in laboratory automation systems comprising a number of laboratory stations, for example pre-analytical, analytical and/or post-analytical stations. The laboratory sample distribution system can be used in order to distribute sample containers between the laboratory stations and other equipment. The sample containers are typically made of transparent plastic material or glass material and have an opening at an upper side. The sample containers can contain samples such as blood samples or other medical samples.

A typical laboratory sample distribution system, a calibration device and a method for calibrating magnetic sensors are disclosed in WO 2011/138448 A1 or US 2016/0069715 A1. As disclosed, sample container carriers move on a transport plane, wherein a number of electro-magnetic actuators are arranged below the transport plane in order to drive the sample container carriers. In order to detect respective positions of the sample container carriers, a number of magnetic sensors, for example Hall-sensors, are distributed over the transport plane. A position detection of the sample container carriers is critical not only for ensuring that transport tasks are fulfilled correctly, but also for low-level embodiment of drive logic.

Hall sensors, however, are heavily influenced by the magnetic field of the actuator coils, need excessive power for operation, and generate excessive heat. The precision of the position detection provided with Hall sensors is lacking due to the presence of blind zones on the surface of the transport plane of the sample distribution system. Another disadvantage of Hall sensors is the high cost of including a large number of sensors, each requiring the construction of mechanical grooves to accommodate the sensors within the driving surface.

Thus, inductive sensors serve as an alternative technology for position sensing. Inductive sensors are based on an inductor serving as a sensing coil that generates an output signal based on an induced eddy current from a conductive surface. Specifically, inductive sensing technology utilizes a capacitor and an inductor to form an L-C resonator, also called L-C tank circuit. This circuit can be used to detect the presence of a conductive object within an alternating current electromagnetic field. Whenever a conductor interacts with an alternating current magnetic field, eddy currents are induced on the conductor's surface. Lenz's Law states that induced currents will flow in a manner to oppose the magnetic field, weakening the original generated magnetic field in a measurable way. This effectively reduces the inductance of the resonant circuit and, as a consequence, the resonant frequency as whenever the inductance is effected, the resonance frequency will change as well. This change is proportional to the distance of the metal surface target with respect to the sensing coil (antenna).

This output signal, however, is non-linear as it is measured within a plane parallel to the transport plane rather than a distance from the LC resonance circuit is measured. Thus, it gives information only about the distance between antenna and target, but not about the relative position as the signal intensity is symmetric around the center of the sensing coil. Also, the intensity of the signal increases as the metal surface approaches the center of the coil during a movement along the transport plane, but also as the vertical distance perpendicular to the transport plane between the metal surface and the sensor coil decreases due to wear and/or manufacturing tolerances.

SUMMARY

In view of the above background, a laboratory sample distribution system and method for operating same are herein introduced. Although the embodiments of the disclosed sample distribution system and method for operating the same are not limited to specific advantages or functionality, the disclosure aims to overcome the above drawbacks and particularly aims to provide a proper determination of the position and direction of movement of the sample carriers. With other words, the disclosed sample distribution system and method for operating the same aim to overcome the problem related to the not-linear and symmetric behavior of inductive sensors.

In accordance with one embodiment of the present disclosure, a laboratory sample distribution system is provided, comprising: a plurality of sample container carriers, each being adapted to carry one or more sample containers, each sample container carrier comprising at least one magnetically active device and at least one electrically conductive member; a transport plane adapted to support the sample container carriers; a plurality of electro-magnetic actuators stationary arranged below the transport plane, the electro-magnetic actuators being adapted to move the sample container carriers on top of the transport plane by applying a magnetic force to the sample container carriers; a plurality of inductive sensors distributed over the transport plane; a control unit configured to control the movement of the sample container carriers on top of the transport plane using an output signal provided by the inductive sensors by driving the electro-magnetic actuators such that the sample container carriers move along corresponding transport paths; and an evaluation unit configured to linearize the output signal received from at least one of the inductive sensors by means of a linearization algorithm, wherein the evaluation unit is further configured to determine at least a distance, particularly a horizontal distance, between at least one of the sample container carriers and the at least one of the inductive sensors based on an output signal value of the linearized output signal.

In accordance with another embodiment of the present disclosure, a method for operating a laboratory sample distribution system according to the present disclosure is provided, comprising: providing a plurality of sample container carrier on the transport plane; moving the sample container carriers along corresponding transport paths; receiving an output signal from at least one of the inducting sensors; linearizing the output signal by means of a linearization algorithm; and determining at least a distance between at least one of the sample container carriers and the at least one of the inductive sensors based on an output signal value of the linearized output signal.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIG. 5 shows a method for calibrating the inductive sensors in accordance with an embodiment of the present disclosure;

FIG. 6 shows a method for compensating a conductive object in a sensing area of the inductive sensors in accordance with an embodiment of the present disclosure;

Figure 1:
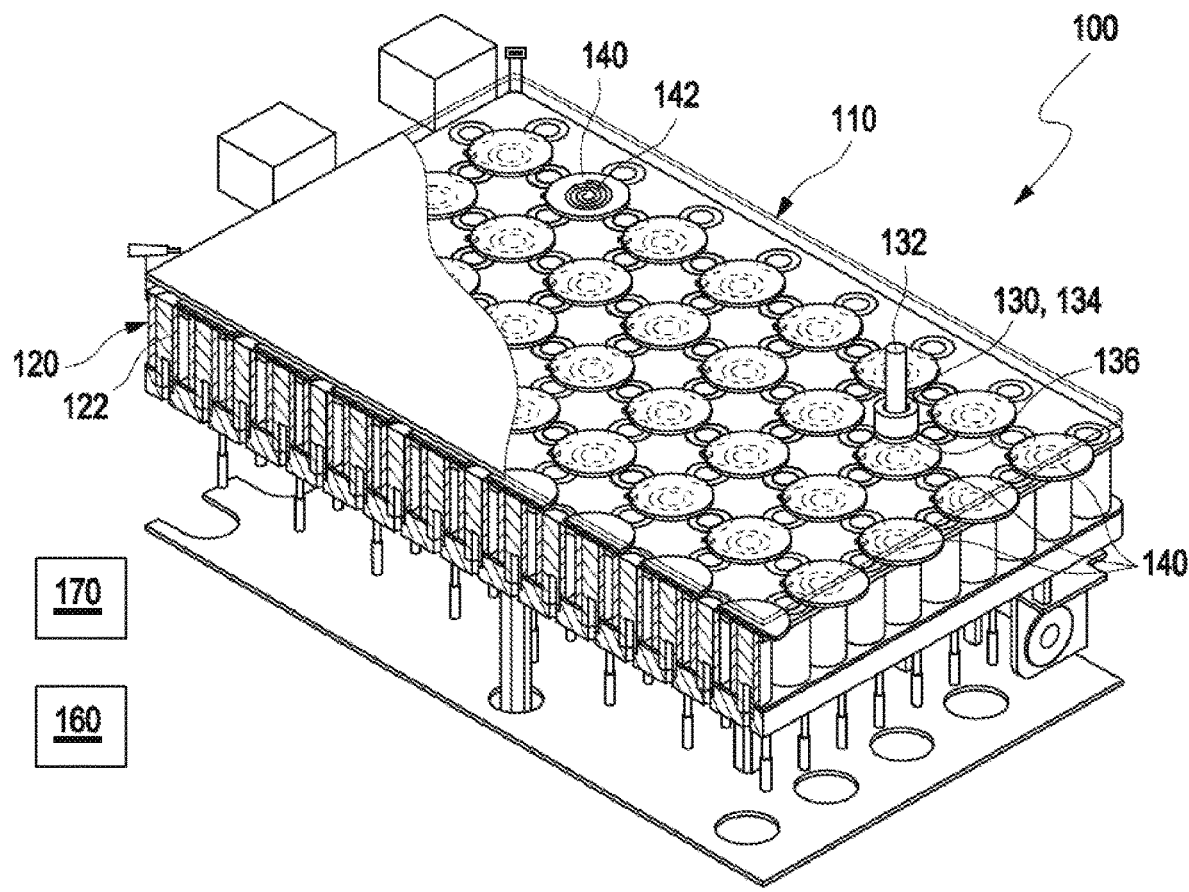
FIG. 1 shows a laboratory sample distribution system in accordance with an embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in such way with other optional or non-optional features of the disclosure.

According to one embodiment, the present disclosure provides a laboratory sample distribution system. The sample distribution system comprises a plurality of sample container carriers. Each the sample container carrier is adapted to carry one or more sample containers. Further, each sample container carrier comprises at least one magnetically active device and at least one electrically conductive member. The sample distribution system further comprises a transport plane adapted to support the sample container carriers. The sample distribution system further comprises a plurality of electro-magnetic actuators stationary arranged below the transport plane. The electro-magnetic actuators are adapted to move the sample container carriers on top of the transport plane by applying a magnetic force to the sample container carriers. The sample distribution system further comprises a plurality of inductive sensors distributed over the transport plane. The sample distribution system further comprises a control unit configured to control the movement of the sample container carriers on top of the transport plane using signals provided by the inductive sensors by driving the electro-magnetic actuators such that the sample container carriers move along corresponding transport paths. The sample distribution system further comprises an evaluation unit configured to linearize the output signal received from at least one of the inductive sensors by means of a linearization algorithm. The evaluation unit is further configured to determine at least a distance between at least one of the sample container carriers and the at least one of the inductive sensors based on an output signal value of the linearized output signal.

The sample container carrier allows to carry sample container while moving on the transport plane. The movement of the sample container carrier is caused by driving the electro-magnetic actuators stationary arranged below the transport plane under control of the control unit. The position of the respective sample container carriers can be detected by the inductive sensors. In order to overcome the problems related to a not-linear and symmetric behaviour of the inductive sensor during operation of the magnetic transportation system provided by the transport plane and the electro-magnetic actuators, the linearization algorithm is used by the evaluation unit. The linearization algorithm converts the non-linear signal into a linear signal or graph, indicating the distance between the target and the center of the inductive sensor represented by its coil or inductor as the sample container carrier moves along the horizontal plane. This linearization algorithm also accounts for the signal symmetry around the coil center. Thus, the term "distance" as used herein refers to a horizontal distance unless otherwise specified. The term "horizontal" as used herein refers to the indication of a direction parallel to the transport plane while the term "vertical" as used herein refers to the indication of a direction perpendicular to the transport plane. As such, the distance may be a horizontal distance unless otherwise specified herein.

The evaluation unit may be further configured to determine a direction of movement of the at least one of the sample container carrier and at least one of the inductive sensors based on at least two different output signal values of the linearized output signal indicating two different distances between the at least one of the sample container carriers and the at least one of the inductive sensors. Thus, the linearization algorithm allows the evaluation unit to reliably monitor the direction of movement of the sample container carrier.

The evaluation unit may be further configured to determine a leaving of a sensing area of one of the inductive sensors by the at least one of the sample container carriers and an approaching of a sensing area of a neighbouring inductive sensor by the at least one of the sample container carriers. Thus, the linearization algorithm allows the evaluation unit to reliably monitor when a sample container carrier leaves the sensing area of one coil of the inductive sensor and approaches the sensing area of a coil of a neighbouring or adjacent inductive sensor.

The evaluation unit may be further configured to track a movement of the at least one of the sample container carriers from a starting position on the transport plane to a final destination on the transport plane. Thus, the linearization algorithm allows the evaluation unit to track the direction of movement of each sample container carrier along each logical position movement from its starting position to the final destination.

The inductive sensors may each comprise at least one inductor and at least one capacitor arranged as a tank circuit. This circuit can detect the presence of a conductive object within an alternating current electromagnetic field. Whenever a conductor interacts with an alternating current magnetic field, eddy currents are induced on the conductor's surface. Lenz's Law states that induced currents will flow in a manner to oppose the magnetic field, weakening the original generated magnetic field in a measurable way. This effectively reduces the inductance of the resonant circuit and, as a consequence, the resonant frequency as whenever the inductance is affected, the resonance frequency will change as well. This change is proportional to the distance of the conductive object with respect to the sensing coil serving as antenna.

The inductor may be arranged below the transport plane. Thus, the inductor may not obstruct the movement of the sample container carriers.

The inductor may be arranged parallel to the transport plane. Thus, the electromagnetic field generated by the inductive sensor is symmetrical within the transport plane around a center of the inductor.

The linearization algorithm may include a look-up table. Thus, computational effort may be saved. Particularly, a look-up table allows savings in terms of processing time since retrieving a value from memory is usually faster than undergoing a computation or input/output operation. Particularly, the linearization algorithm may include a single look-up table. Particularly, the linearization algorithm may include a single look-up table until and unless the shape and structure of the coils is consistent.

The look-up table may describe an intensity of the output signal for each inductive sensor as a function of a horizontal distance parallel to the transport plane between a reference object and the respective inductive sensor. Thus, the output signal increases as a sample container carrier approaches the inductive sensor as the horizontal distance decreases while the vertical distance perpendicular to the transport plane can be assumed remaining constant.

The evaluation unit may be further configured to compensate a presence of a conductive object in a sensing area of at least one of the inductive sensors. During operation the inductive sensor could be required to work with a conductive object in the proximity of its antenna such as a fixed conductive object. By measuring the output value from the antenna, the presence of an object affecting the reading of the antenna can be detected and quantified.

The evaluation unit may be configured to compensate the presence of a conductive object in a sensing area of at least one of the inductive sensors by measuring the output signal of the respective inductive sensor during absence of a sample container carrier in the sensing area. By measuring the output value from the antenna while there are no sample container carriers (targets) on the surface, the presence of an object affecting the reading of the antenna can be detected and quantified.

The evaluation unit may be configured to compensate the presence of the conductive object in the sensing area of at least one of the inductive sensors as an offset if an output signal value of the measured output signal of the respective inductive sensor during absence of a sample container carrier in the sensing area is below a predetermined threshold. If the measured value is not too high, it can be compensated by treating it as a non-linear but deterministic offset.

The evaluation unit may be configured to compensate the presence of the conductive object in the sensing area of at least one of the inductive sensors as an error if an output signal value of the measured output signal of the respective inductive sensor during absence of a sample container carrier in the sensing area is above a predetermined threshold. On the other hand, if the measured disturb is too high and cannot be handled, the system will detect that is performing outside of specifications and can raise an error and avoid using the antenna subjected to external disturbances.

The evaluation unit may be further configured to detect a change of electrically conductive characteristics of the sample container carriers by periodically measuring a maximum output signal value of the output signals of the inductive sensors. Since the calibration is performed by measuring the maximum value for the reference object, the antenna can detect changes to the single holder targets, caused by wear or damage, by periodically measuring the maximum signal intensity. If the conductive target generates a maximum value outside of specification (either the target is defected or by wear/tolerances the distance to the antenna is outside of specifications), the error can be detected. By performing periodically checks, the system can monitor changes in the sensing targets measured values over time. Predictive maintenance can be achieved by observing a pattern leading to a sensor reading failure before the failure actually happens.

The sample container carriers may be single sample container carriers.

According to another embodiment, the present disclosure provides a method for operating a laboratory sample distribution system according the above details. The method comprises: providing a plurality of sample container carrier on the transport plane; moving the sample container carriers along corresponding transport paths; receiving an output signal from at least one of the inducting sensors; linearizing the output signal by means of a linearization algorithm; and determining at least a distance between at least one of the sample container carriers and the at least one of the inductive sensors based on an output signal value of the linearized output signal value.

The method may further comprise determining a direction of movement of the at least one of the sample container carrier and at least one of the inductive sensors based on at least two different output signal values of the linearized output signal indicating two different distances between the at least one of the sample container carriers and the at least one of the inductive sensors.

The method may further comprise determining a leaving of a sensing area of one of the inductive sensors by the at least one of the sample container carriers and an approaching of a sensing area of a neighbouring inductive sensor by the at least one of the sample container carriers.

The method may further comprise tracking a movement of the at least one of the sample container carriers from a starting position on the transport plane to a final destination on the transport plane.

The method may further comprise compensating a presence of a conductive object in a sensing area of at least one of the inductive sensors.

The method may further comprise compensating the presence of a conductive object in a sensing area of at least one of the inductive sensors by measuring the output signal of the respective inductive sensor during absence of a sample container carrier in the sensing area.

The method may further comprise compensating the presence of the conductive object in the sensing area of at least one of the inductive sensors as an offset if an output signal value of the measured output signal of the respective inductive sensor during absence of a sample container carrier in the sensing area is below a predetermined threshold.

The method may further comprise compensating the presence of the conductive object in the sensing area of at least one of the inductive sensors as an error if an output signal value of the measured output signal of the respective inductive sensor during absence of a sample container carrier in the sensing area is above a predetermined threshold.

The method may further comprise detecting a change of electrically conductive characteristics of the sample container carriers by periodically measuring a maximum output signal value of the output signals of the inductive sensors.

The term "laboratory sample distribution system" as used herein is a broad term and is to be given its ordinary and customary meaning to a person of ordinary skill in the art and is not to be limited to a special or customized meaning. The term specifically may refer, without limitation, to a part or device of a laboratory automation system allowing to distribute sample containers carriers to a target destination within the laboratory automation system. Laboratory sample distribution systems are used in laboratory automation systems comprising a number of laboratory stations, for example pre-analytical, analytical and/or post-analytical stations. The laboratory sample distribution system can be used in order to distribute sample containers between the laboratory stations and other equipment.

The term "sample container carrier" as used herein is a broad term and is to be given its ordinary and customary meaning to a person of ordinary skill in the art and is not to be limited to a special or customized meaning. The term specifically may refer, without limitation, to any device configured to hold one or more laboratory diagnostic containers or vessels and to be supplied through a conveying or transport line. Thus, the sample container carrier may be configured as a single container carrier suitable to receive a single laboratory diagnostic container or a rack suitable to receive a plurality of containers. Without any restriction, particular embodiments are described with reference to so called test tube holders. Such a test tube holder can hold one single test tube containing a sample or reagent and convey the test tube via a conveyor or transport line to different modules of an automated laboratory system such as an automated sample testing system. The test tube holder comprises a housing with a spring for fixing a test tube, a test tube holder body housing, and a bottom lid housing. The housing with a spring for fixing a test tube has a columnar structure whose center part is roundly bored so as to allow the insertion of the test tube, and is provided with spring parts inside projecting parts extending upward. It is to be noted that the housing with a spring usually has a columnar shape, but it may have any shape as long as the housing can vertically hold the test tube by the spring parts provided equidistantly or equiangularly, and an outer shape of the housing may be a polygonal column shape. The test tube holder body housing has a cylindrical shape, and desirably has a cavity part therein. In the cavity part, a tag with a unique ID number, a weight for stably conveying the test tube, and others are housed. Also, the test tube holder body housing and the bottom lid housing have an outer diameter larger than that of the test tube to be conveyed and smaller than the width of the conveyor line. Note that the shape of the test tube holder body housing and the bottom lid housing may be, for example, a polygonal shape. Even in that case, a maximum length in a cross-sectional direction is desirably smaller than the width of the conveyor or transport line.

Particular test tube holder that may be used with the present disclosure are described in EP 2 902 790 A1, the contents thereof concerning the design or construction vessel carriers is incorporated by reference in this application. The sample containers are typically made of transparent plastic material or glass material and have an opening at an upper side. The sample containers can contain samples such as blood samples or other medical samples.

The term "magnetically active device" as used herein is a broad term and is to be given its ordinary and customary meaning to a person of ordinary skill in the art and is not to be limited to a special or customized meaning. The term specifically may refer, without limitation, to any device, element or member comprising magnetic characteristics. The magnetically active device may be a magnet such as a permanent magnet.

The term "electrically conductive member" as used herein is a broad term and is to be given its ordinary and customary meaning to a person of ordinary skill in the art and is not to be limited to a special or customized meaning. The term specifically may refer, without limitation, to any device, element or member comprising electrically conductive characteristics. Electrical conductivity or specific conductance is the reciprocal of electrical resistivity. It represents a material's ability to conduct electric current. A high electrical conductivity indicates a material that readily allows electric current. The electrically conductive member may be a metal member such as a copper foil or the like.

The term "transport plane" as used herein is a broad term and is to be given its ordinary and customary meaning to a person of ordinary skill in the art and is not to be limited to a special or customized meaning. The term specifically may refer, without limitation, to any plane that is configured to support sample container carriers. A plane is a flat, two-dimensional surface. A plane is the two-dimensional analogue of a point (zero dimensions), a line (one dimension) and three-dimensional space.

The term "electro-magnetic actuator" as used herein is a broad term and is to be given its ordinary and customary meaning to a person of ordinary skill in the art and is not to be limited to a special or customized meaning. The term specifically may refer, without limitation, to any actuator having an electromagnet. An actuator is a component of a machine that is responsible for moving and controlling a mechanism or system, for example by opening a valve. In simple terms, it is a "mover". In the present case, the actuator may move the sample container carriers on top of the transport plane by applying a magnetic force to the sample container carriers. An actuator requires a control signal and a source of energy. The control signal is relatively low energy and may be electric voltage or current, pneumatic or hydraulic pressure, or even human power. Its main energy source may be an electric current, hydraulic fluid pressure, or pneumatic pressure. When it receives a control signal, an actuator responds by converting the source's energy into mechanical motion. An electromagnet is a type of magnet in which the magnetic field is produced by an electric current. Electromagnets usually consist of wire wound into a coil. A current through the wire creates a magnetic field which is concentrated in the hole, denoting the center of the coil. The magnetic field disappears when the current is turned off. The wire turns are often wound around a magnetic core made from a ferromagnetic or ferromagnetic material such as iron; the magnetic core concentrates the magnetic flux and makes a more powerful magnet. The main advantage of an electromagnet over a permanent magnet is that the magnetic field can be quickly changed by controlling the amount of electric current in the winding.

The term "inductive sensor" as used herein is a broad term and is to be given its ordinary and customary meaning to a person of ordinary skill in the art and is not to be limited to a special or customized meaning. The term specifically may refer, without limitation, to a sensor based on an inductor serving as a sensing coil that generates an output signal based on an induced eddy current from a conductive surface. Specifically, inductive sensing technology utilizes a capacitor and an inductor to form an L-C resonator, also called L-C tank circuit. This circuit can be used to detect the presence of a conductive object within an alternating current electromagnetic field. Whenever a conductor interacts with an alternating current magnetic field, eddy currents are induced on the conductor's surface. Lenz's Law states that induced currents will flow in a manner to oppose the magnetic field, weakening the original generated magnetic field in a measurable way. This effectively reduces the inductance of the resonant circuit and, as a consequence, the resonant frequency as whenever the inductance is affected, the resonance frequency will change as well. This change is proportional to the distance of the metal surface target with respect to the sensing coil (antenna).

The term "control unit" as used herein is a broad term and is to be given its ordinary and customary meaning to a person of ordinary skill in the art and is not to be limited to a special or customized meaning. The term specifically may refer, without limitation, to any device configured to control parts of a laboratory sample distribution system. The term may specifically refer to any embedded system in a laboratory sample distribution system that controls one or more of the electrical components or modules therein.

The term "evaluation unit" as used herein is a broad term and is to be given its ordinary and customary meaning to a person of ordinary skill in the art and is not to be limited to a special or customized meaning. The term specifically may refer, without limitation, to any device configured to any device configured to provide additional functions, such as frequency filters or calculation functions. The evaluation unit can thus eliminate the need to use additional hardware, such as computers or logic modules. Typically, it is possible to connect multiple sensors to a single evaluation unit.

The term "linearize" or "linearization" as used herein is a broad term and is to be given its ordinary and customary meaning to a person of ordinary skill in the art and is not to be limited to a special or customized meaning. The term specifically may refer, without limitation, to finding the linear approximation to a function at a given point. Linearization makes it possible to use tools for studying linear systems to analyze the behavior of a nonlinear function near a given point. The linear approximation of a function is the first order Taylor expansion around the point of interest. Particularly, the term may refer to the conversion of a non-linear function or graph into a linear function or graph.

The term "algorithm" as used herein is a broad term and is to be given its ordinary and customary meaning to a person of ordinary skill in the art and is not to be limited to a special or customized meaning. The term specifically may refer, without limitation, to a finite sequence of well-defined, computer-implementable instructions, typically to solve a class of problems or to perform a computation. Algorithms are always unambiguous and are used as specifications for performing calculations, data processing, automated reasoning, and other tasks. As an effective method, an algorithm can be expressed within a finite amount of space and time, and in a well-defined formal language for calculating a function. Starting from an initial state and initial input (perhaps empty), the instructions describe a computation that, when executed, proceeds through a finite number of well-defined successive states, eventually producing "output" and terminating at a final ending state. The transition from one state to the next is not necessarily deterministic; some algorithms, known as randomized algorithms, incorporate random input.

The term "output signal" as used herein is a broad term and is to be given its ordinary and customary meaning to a person of ordinary skill in the art and is not to be limited to a special or customized meaning. The term specifically may refer, without limitation, to a signal that comes out of an electronic system.

The term "sensing area" as used herein is a broad term and is to be given its ordinary and customary meaning to a person of ordinary skill in the art and is not to be limited to a special or customized meaning. The term specifically may refer, without limitation, to a spatial range where a sensor effectively can sense or detect something.

The term "inductor" as used herein is a broad term and is to be given its ordinary and customary meaning to a person of ordinary skill in the art and is not to be limited to a special or customized meaning. The term specifically may refer, without limitation, to a passive two-terminal electrical component that stores energy in a magnetic field when electric current flows through it. An inductor typically consists of an insulated wire wound into a coil around a core. When the current flowing through an inductor changes, the time-varying magnetic field induces an electromotive force (e.m.f.) (voltage) in the conductor, described by Faraday's law of induction. According to Lenz's law, the induced voltage has a polarity (direction) which opposes the change in current that created it. As a result, inductors oppose any changes in current through them. An inductor is characterized by its inductance, which is the ratio of the voltage to the rate of change of current. An inductor is also called a coil, choke, or reactor.

The term "capacitor" as used herein is a broad term and is to be given its ordinary and customary meaning to a person of ordinary skill in the art and is not to be limited to a special or customized meaning. The term specifically may refer, without limitation, to a device that stores electrical energy in an electric field. It is a passive electronic component with two terminals. The effect of a capacitor is known as capacitance. While some capacitance exists between any two electrical conductors in proximity in a circuit, a capacitor is a component designed to add capacitance to a circuit. Unlike a resistor, an ideal capacitor does not dissipate energy, although real-life capacitors do dissipate a small amount. (See Non-ideal behavior) When an electric potential, a voltage, is applied across the terminals of a capacitor, for example when a capacitor is connected across a battery, an electric field develops across the dielectric, causing a net positive charge to collect on one plate and net negative charge to collect on the other plate. No current actually flows through the dielectric. However, there is a flow of charge through the source circuit. If the condition is maintained sufficiently long, the current through the source circuit ceases. If a time-varying voltage is applied across the leads of the capacitor, the source experiences an ongoing current due to the charging and discharging cycles of the capacitor.

The term "look-up table" as used herein is a broad term and is to be given its ordinary and customary meaning to a person of ordinary skill in the art and is not to be limited to a special or customized meaning. The term specifically may refer, without limitation, to an array that replaces runtime computation with a simpler array indexing operation. The savings in terms of processing time can be significant, since retrieving a value from memory is often faster than undergoing an "expensive" computation or input/output operation. [1] The tables may be precalculated and stored in static program storage, calculated (or "pre-fetched") as part of a program's initialization phase (memorization), or even stored in hardware in application-specific platforms. Lookup tables are also used extensively to validate input values by matching against a list of valid (or invalid) items in an array and, in some programming languages, may include pointer functions (or offsets to labels) to process the matching input. FPGAs also make extensive use of reconfigurable, hardware-implemented, lookup tables to provide programmable hardware functionality.

Further disclosed and proposed herein is a computer program including computer-executable instructions for performing the method according to the present disclosure in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps a) to d) as indicated above may be performed by using a computer or a computer network, typically by using a computer program.

Further disclosed and proposed herein is a computer program product having program code means, in order to perform the method according to the present disclosure in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:

- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

Summarizing and without excluding further possible embodiments, the following embodiments may be envisaged:

Embodiment 1: A laboratory sample distribution system, comprising:
- a plurality of sample container carrier, each being adapted to carry one or more sample containers, each sample container carrier comprising at least one magnetically active device and at least one electrically conductive member,
- a transport plane adapted to support the sample container carriers,
- a plurality of electro-magnetic actuators stationary arranged below the transport plane, the electro-magnetic actuators being adapted to move the sample container carriers on top of the transport plane by applying a magnetic force to the sample container carriers,
- a plurality of inductive sensors distributed over the transport plane,
- a control unit configured to control the movement of the sample container carriers on top of the transport plane using signals provided by the inductive sensors by driving the electro-magnetic actuators such that the sample container carriers move along corresponding transport paths, and
- an evaluation unit configured to linearize the output signal received from at least one of the inductive sensors by means of a linearization algorithm, wherein the evaluation unit is further configured to determine at least a distance, particularly a horizontal distance, between at least one of the sample container carriers and the at least one of the inductive sensors based on an output signal value of the linearized output signal.

Embodiment 2: The laboratory sample distribution system according to the preceding embodiment, wherein the evaluation unit is further configured to determine a direction of movement of the at least one of the sample container carrier and at least one of the inductive sensors based on at least two different output signal values of the linearized output signal indicating two different distances between the at least one of the sample container carriers and the at least one of the inductive sensors.

Embodiment 3: The laboratory sample distribution system according any preceding embodiment, wherein the evaluation unit is further configured to determine a leaving of a sensing area of one of the inductive sensors by the at least one of the sample container carriers and an approaching of a sensing area of a neighboring inductive sensor by the at least one of the sample container carriers.

Embodiment 4: The laboratory sample distribution system according any preceding embodiment, wherein the evaluation unit is further configured to track a movement of the at least one of the sample container carriers from a starting position on the transport plane to a final destination on the transport plane.

Embodiment 5: The laboratory sample distribution system according any preceding embodiment, wherein the inductive sensors each comprise at least one inductor and at least one capacitor arranged as a tank circuit.

Embodiment 6: The laboratory sample distribution system according to the preceding embodiment, wherein the inductor is arranged below the transport plane.

Embodiment 7: The laboratory sample distribution system according to the preceding embodiment, wherein the inductor is arranged parallel to the transport plane.

Embodiment 8: The laboratory sample distribution system according any preceding embodiment, wherein the linearization algorithm includes a look-up table.

Embodiment 9: The laboratory sample distribution system according to the preceding embodiment, wherein the look-up table describes an intensity of the output signal for each inductive sensor as a function of a horizontal distance parallel to the transport plane between a reference object and the respective inductive sensor.

Embodiment 10: The laboratory sample distribution system according any preceding embodiment, wherein the evaluation unit is further configured to compensate a presence of a conductive object in a sensing area of at least one of the inductive sensors.

Embodiment 11: The laboratory sample distribution system according to the preceding embodiment, wherein the evaluation unit is configured to compensate the presence of a conductive object in a sensing area of at least one of the inductive sensors by measuring the output signal of the respective inductive sensor during absence of a sample container carrier in the sensing area.

Embodiment 12: The laboratory sample distribution system according to the preceding embodiment, wherein the evaluation unit is configured to compensate the presence of the conductive object in the sensing area of at least one of the inductive sensors as an offset if a output signal value of the measured output signal of the respective inductive sensor during absence of a sample container carrier in the sensing area is below a predetermined threshold.

Embodiment 13: The laboratory sample distribution system according to embodiment 11, wherein the evaluation unit is configured to compensate the presence of the conductive object in the sensing area of at least one of the inductive sensors as an error if a output signal value of the measured output signal of the respective inductive sensor during absence of a sample container carrier in the sensing area is above a predetermined threshold.

Embodiment 14: The laboratory sample distribution system according any preceding embodiment, wherein the evaluation unit is further configured to detect a change of electrically conductive characteristics of the sample container carriers by periodically measuring a maximum output signal value of the output signals of the inductive sensors.

Embodiment 15: The laboratory sample distribution system according any preceding embodiment, wherein the sample container carriers are single sample container carriers.

Embodiment 16: Method for operating a laboratory sample distribution system according any preceding embodiment, comprising:
  providing a plurality of sample container carrier on the transport plane,
  moving the sample container carriers along corresponding transport paths,
  receiving an output signal from at least one of the inducting sensors,
  linearizing the output signal by means of a linearization algorithm, and
  determining at least a distance between at least one of the sample container carriers and the at least one of the inductive sensors based on an output signal value of the linearized output signal.

Embodiment 17: The method according to the preceding embodiment, further comprising determining a direction of movement of the at least one of the sample container carrier and at least one of the inductive sensors based on at least two different output signal values of the linearized output signal indicating two different distances between the at least one of the sample container carriers and the at least one of the inductive sensors.

Embodiment 18: The method according to embodiment 16 or 17, further comprising determining a leaving of a sensing area of one of the inductive sensors by the at least one of the sample container carriers and an approaching of a sensing area of a neighbouring inductive sensor by the at least one of the sample container carriers.

Embodiment 19: The method according to any one of embodiments 16 to 18, further comprising tracking a movement of the at least one of the sample container carriers from a starting position on the transport plane to a final destination on the transport plane.

Embodiment 20: The method according to any one of embodiments 16 to 19, further comprising compensating a presence of a conductive object in a sensing area of at least one of the inductive sensors.

Embodiment 21: The method according to the preceding embodiment, further comprising compensating the presence of a conductive object in a sensing area of at least one of the inductive sensors by measuring the output signal of the respective inductive sensor during absence of a sample container carrier in the sensing area.

Embodiment 22: The method according to the preceding embodiment, further comprising compensating the presence of the conductive object in the sensing area of at least one of the inductive sensors as an offset if a output signal value of the measured output signal of the respective inductive sensor during absence of a sample container carrier in the sensing area is below a predetermined threshold.

Embodiment 23: The method according to embodiment 21, further comprising compensating the presence of the conductive object in the sensing area of at least one of the inductive sensors as an error if a output signal value of the measured output signal of the respective inductive sensor during absence of a sample container carrier in the sensing area is above a predetermined threshold.

Embodiment 24: The method according to any one of embodiments 16 to 23, further comprising detecting a change of electrically conductive characteristics of the sample container carriers by periodically measuring a maximum output signal value of the output signals of the inductive sensors.

In order that the embodiments of the present disclosure may be more readily understood, reference is made to the following examples, which are intended to illustrate the disclosure, but not limit the scope thereof.

FIG. 1 shows a laboratory sample distribution system 100. The laboratory sample distribution system 100 may be part of a laboratory automation system (not shown in detail), which comprises one or more laboratory stations. Such laboratory stations can, for example, be pre-analytical, analytical and/or post-analytical stations. They can, for example, perform tasks like analyzing a sample, centrifugation of a sample, and the like.

The laboratory sample distribution system 100 comprises a transport plane 110, under which a plurality of electro-magnetic actuators 120 is arranged. Each electro-magnetic actuator 120 has a corresponding ferromagnetic magnetic core 122. The electro-magnetic actuators 120 may be arranged similar to a grid including crossing lines or rows.

The laboratory sample distribution system 100 further comprises a plurality of sample container carriers 130. It has to be noted that for reasons of clarity only one exemplary sample container carrier 130 is shown in FIG. 1. The sample container carrier 130 is configured to carry a sample container 132 that may be embodied as a tube. Each sample container carrier 130 comprises a magnetically active device 134 such as a permanent magnet. Those permanent magnets are contained inside the sample container carriers 130. Each sample container carrier 130 further comprises at least one electrically conductive member 136. The electrically conductive member 136 may be arranged at or adjacent a bottom of the sample container carrier 130. The electrically conductive member 136 may be made of metal. For example, the electrically conductive member 136 is embodied as a copper foil arranged at or adjacent a bottom of the sample container carrier 130.

Figure 2:
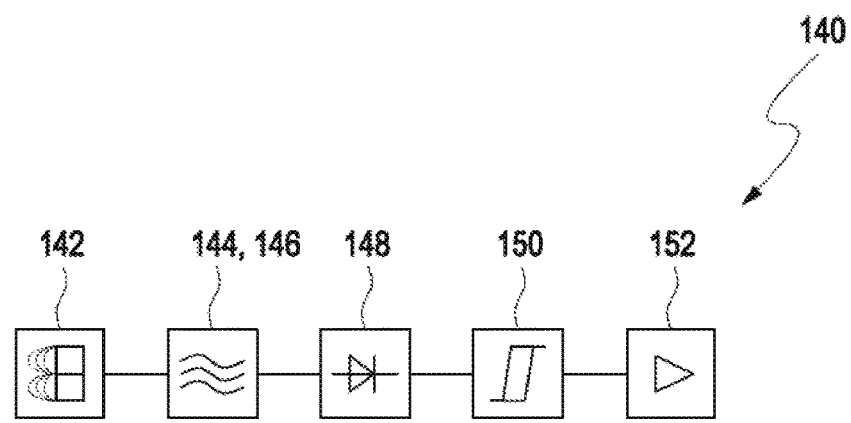
FIG. 2 shows elements of an inductive sensor in accordance with an embodiment of the present disclosure.

The laboratory sample distribution system 100 further comprises a plurality of inductive sensors 140 which are distributed over the transport plane 110. As shown in FIG. 1, the inductive sensors 140 are arranged at logical positions defined by crossings of the electro-magnetic actuators 120. FIG. 2 shows elements of the inductive sensor 140. The inductive sensor 140 comprises at least one inductor 142 serving as a detector coil and at least one capacitor 144 being part of an oscillator 146. Further, the inductive sensor 140 comprises a demodulator 148, a flip-flop 150 and an output 152.

Figure 3:
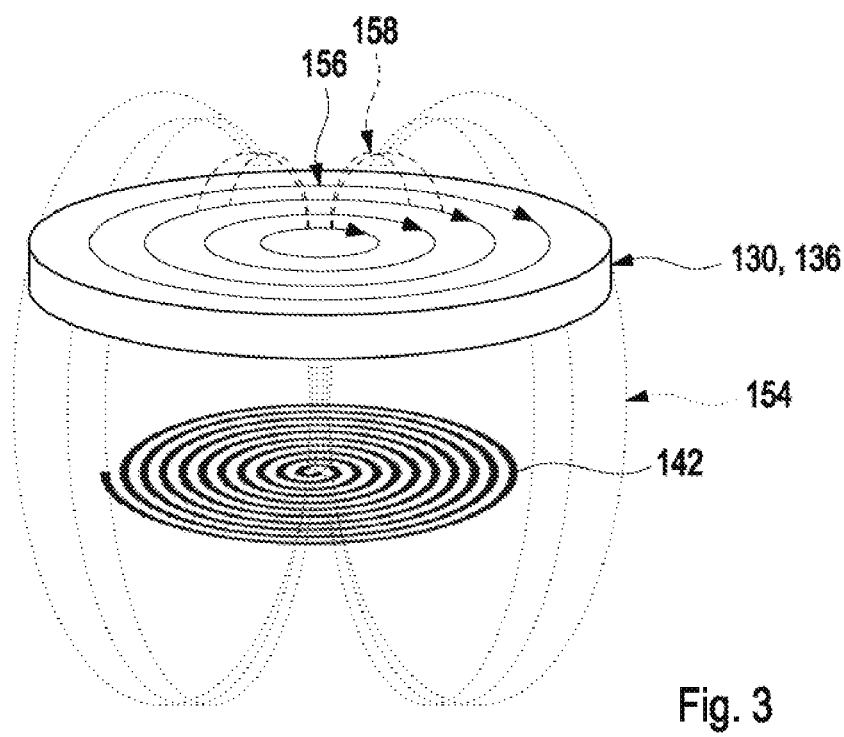
FIG. 3 shows an operation principle of the inductive sensor in accordance with an embodiment of the present disclosure.

FIG. 3 shows an operation principle of the inductive sensor 140. The inductor 142 may be a number of turns of insulated magnet wire wound around a high magnetic permeability core, such as a ferrite ceramic rod or coil form, and the winding may or may not have a feedback tap some number of turns from one end of the total winding. It is connected to the capacitor 144 to form a tank circuit. It has to be noted that the capacitor 144 is not shown in FIG. 3 for reasons of clarity. In conjunction with a voltage or current gain device like a transistor or operational amplifier, this forms the oscillator 146 as a tuned frequency oscillator. When power is applied, the resulting oscillation is a high frequency alternating electric current in the inductor 142 that has a constantly changing magnetic field 154 able to induces eddy currents 156 in proximal (target) conductors such as the electrically conductive member 136 of a sample container carrier 130. The closer the target is and the greater its conductivity (metals are good conductors, for example), the greater the induced eddy currents 156 are and the more effect their resulting opposing magnetic fields 158 have on the magnitude and frequency of the oscillation. Its magnitude is reduced as the load is increased in a non-magnetic conductor like aluminum because the induced field in the target opposes the source induction field, lowering net inductive impedance and therefore simultaneously tuning the oscillation frequency higher. But that magnitude is less affected if the target is a highly magnetically permeable material, like iron, as that high permeability increases the coil inductance, lowering the frequency of oscillation. A change in oscillation magnitude may be detected with a simple amplitude modulation detector like a diode that passes the peak voltage value to a small filter to produce a reflective DC voltage value, while a frequency change may be detected by one of several kinds frequency discriminator circuits, like a phase lock loop detector, to see in what direction and how much the frequency shifts. Either the magnitude change or the amount of frequency change can serve to defined a proximity distance at which the sensors go from on to off, or vice versa. With other words, the tank circuit can be used to detect the presence of a conductive object such as the electrically conductive member 136 within the generated alternating current electromagnetic field 154. Whenever a conductor interacts with the generated alternating current magnetic field 154, eddy currents 156 are induced on the conductor's surface. Lenz's Law states that induced currents will flow in a manner to oppose the magnetic field, weakening the original generated magnetic field 154 in a measurable way. This effectively reduces the inductance of the resonant circuit and, as a consequence, the resonant frequency. This change is proportional to the distance of the metal surface (target) with respect to the inductor 142 serving as sensing coil or antenna. The inductor 142 is arranged below the transport plane 110. Particularly, the inductor 142 is arranged parallel to the transport plane 110. With other words, the center axis around which the wire or coil of the inductor 142 is wound is arranged perpendicular to the transport plane 110.

As is further shown in FIG. 1, the laboratory sample distribution system 100 further comprises a control unit 160 that is adapted to drive the electro-magnetic actuators 120 such that the sample container carriers 130 move along respective transport paths. For that purpose, each sample container carrier 130 comprises the magnetically active device 132 such as the permanent magnet. The control unit 160 controls the movement of the sample container carrier 130 on top of the transport plane 110 using an output signal provided by the inductive sensors 140. The control unit 160 receives output signals from the inductive sensors 140 to determine the position of a sample container carrier 130 on the transport plane. The inductive sensors 140 sense a variation of the generated magnetic field.

The laboratory sample distribution system 100 further comprises an evaluation unit 170.

The evaluation unit 170 is configured to linearize the output signal received from at least one of the inductive sensors 140 by means of a linearization algorithm. The evaluation unit 170 is further configured to determine at least a distance between at least one of the sample container carriers 130 and the at least one of the inductive sensors 140 based on an output signal value of the linearized output signal value. Needless to say, the control unit 160 may determine the position of a sample container carrier 130 on the transport plane based on the linearized out signal value. The linearization algorithm includes a look-up table. The look-up table describes an intensity of the output signal for each inductive sensor 140 as a function of a horizontal distance parallel to the transport plane 110 between a reference object and the respective inductive sensor 140 as will explained in further detail below.

The evaluation unit 170 is further configured to determine a direction of movement of the at least one of the sample container carrier 130 and at least one of the inductive sensors 140 based on at least two different output signal values of the linearized output signal indicating two different distances between the at least one of the sample container carriers 130 and the at least one of the inductive sensors 140. The evaluation unit 170 is further configured to determine a leaving of a sensing area of one of the inductive sensors 140 by the at least one of the sample container carriers 130 and an approaching of a sensing area of a neighbouring inductive sensor 140 by the at least one of the sample container carriers 130. The evaluation unit 170 is further configured to track a movement of the at least one of the sample container carriers 130 from a starting position on the transport plane 110 to a final destination on the transport plane 110. In this respect, it has to be noted, that the starting position and/or the final destination may be defined by the control unit 160. The evaluation unit 170 and the control unit 160 communicate with one another.

Figure 4:
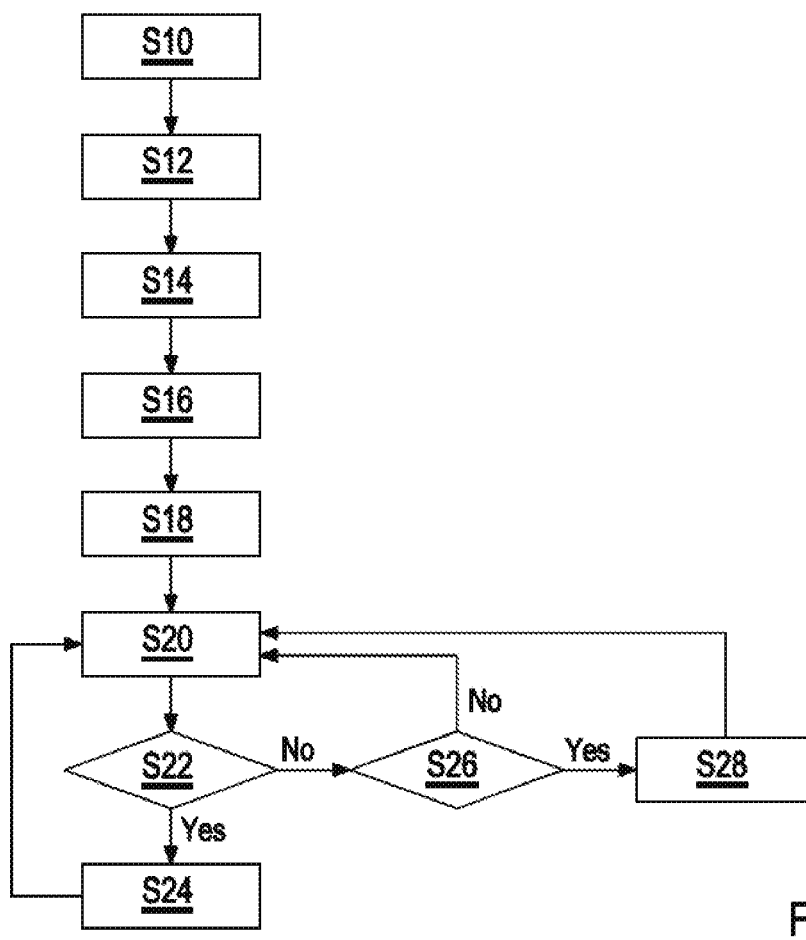
FIG. 4 shows a flow chart of a method for detecting a movement of a sample container carrier in accordance with an embodiment of the present disclosure.

FIG. 4 shows a flow chart of a method for detecting a movement of a sample container carrier 130. The method includes a linearization of the output signal of the inductive sensors 140 as will be explained in further detail hereinafter. At the beginning in step S10, the inductive sensor 140 is initialized and the evaluation unit 170 gets a sensor value. In subsequent step S12, the inductive sensor 140 provides non-linear sensor values as output signal. In subsequent step S14, the evaluation unit 170 linearizes the sensor values by the look up table as part of the linearization algorithm. In subsequent step S16, the evaluation unit 170 determines and/or provides the direction and initial position of the sample container carrier 130. In subsequent step S18, the control unit 160 selects the appropriate path for the sample container carrier 130 and the evaluation unit 170 sets the sensor value based on the current position. In subsequent step S20, the evaluation unit 170 adds a value of linearized distance from the current inductive sensor 140. In subsequent step S22, the evaluation unit determines whether the linearized value of the current inductive sensor 140 exceeds a threshold such as 18 mm. If the linearized value of the current inductive sensor 140 exceeds the threshold, the method proceeds to step S24. In step S24, the evaluation unit 170 change or switches to the coil or inductor 142 of the next or neighboring inductive sensor 140. Subsequently, the method returns to step S20. If the linearized value of the current inductive sensor 140 does not exceed the threshold in step S22, the method proceeds to step S26. In step S26, the evaluation unit determines whether the linearized value of the current inductive sensor 140 exceeds a further threshold such as 5 mm and whether the new or current sensor value is smaller than the previous or old sensor value. If the linearized value of the current inductive sensor 140 is not smaller than the further threshold and the new or current sensor value is not smaller than the previous or old sensor value, the method returns to step S20. If the linearized value of the current inductive sensor 140 is smaller than the further threshold and the new or current sensor value is smaller than the previous or old sensor value, the method proceeds to step S28. In step S28, the evaluation unit 170 changes to the other side of symmetry of the coil or inductor 142 of the inductive sensor 140. Subsequently, the method returns to step S20.

FIG. 5 shows a method for calibrating the inductive sensors 140. Merely as an example, four inductive sensors 140 are shown. Each inductive coil or inductor 142 has a different behavior and generates different signals for the same conductive target at the same distance as shown in the left portion of FIG. 5. This problem makes it difficult to correlate and integrate together information in a system where a target is moving over different inductors 142 serving as antennas. During manufacturing of the transport plane 110, all inductive sensors 140 are calibrated using a reference object 180, defining specific output signals at a predefined vertical distance 182 between the reference object 180 and each sensor coil or inductor 142 as shown in the middle portion of FIG. 5. The vertical distance 182 is a distance perpendicular to the transport plane 110 and may be adjusted as appropriate. This calibration during manufacturing results in the look-up table describing the intensity of the position signal as a function of a horizontal distance parallel to the transport plane 110 between the reference object 180 and the sensing coil or inductor 142. The calibration results in a standardized common behavior of the inductive sensors 140 as shown in the right portion of FIG. 5. Particularly, the calibration shown in FIG. 5 is carried out with respect to horizontal distances in contrast to the calibration described in WO 2011/138448 A1 or US 2016/0069715 A1 taking into account vertical distances. Particularly, a single look-up table may be created applicable for all sensor coils 142 as will be explained in further detail below.

FIG. 6 shows a method for compensating a conductive object 190 in a sensing area of the inductive sensors 140. Merely as an example, four inductive sensors 140 are shown. During operation the inductive sensor 140 could be required to work with 190 conductive object present in the proximity of the inductor as shown in the left portion of FIG. 6. By measuring the output value from the inductor 140 while there are no sample container carriers 130 on the transport plane 110, the presence of the conductive object 190 affecting the reading of the inductor 142 can be detected and quantified as shown in the middle portion of FIG. 6. The evaluation unit 170 is configured to compensate the presence of the conductive object 190 in the sensing area of at least one of the inductive sensors 140 as an offset if a output signal value of the measured output signal of the respective inductive sensor 140 during absence of a sample container carrier 130 in the sensing area is below a predetermined threshold as shown in the right portion of FIG. 6. With other words, if the measured value is not too high, it can be compensated by treating it as a non-linear but deterministic offset.

Figure 7:
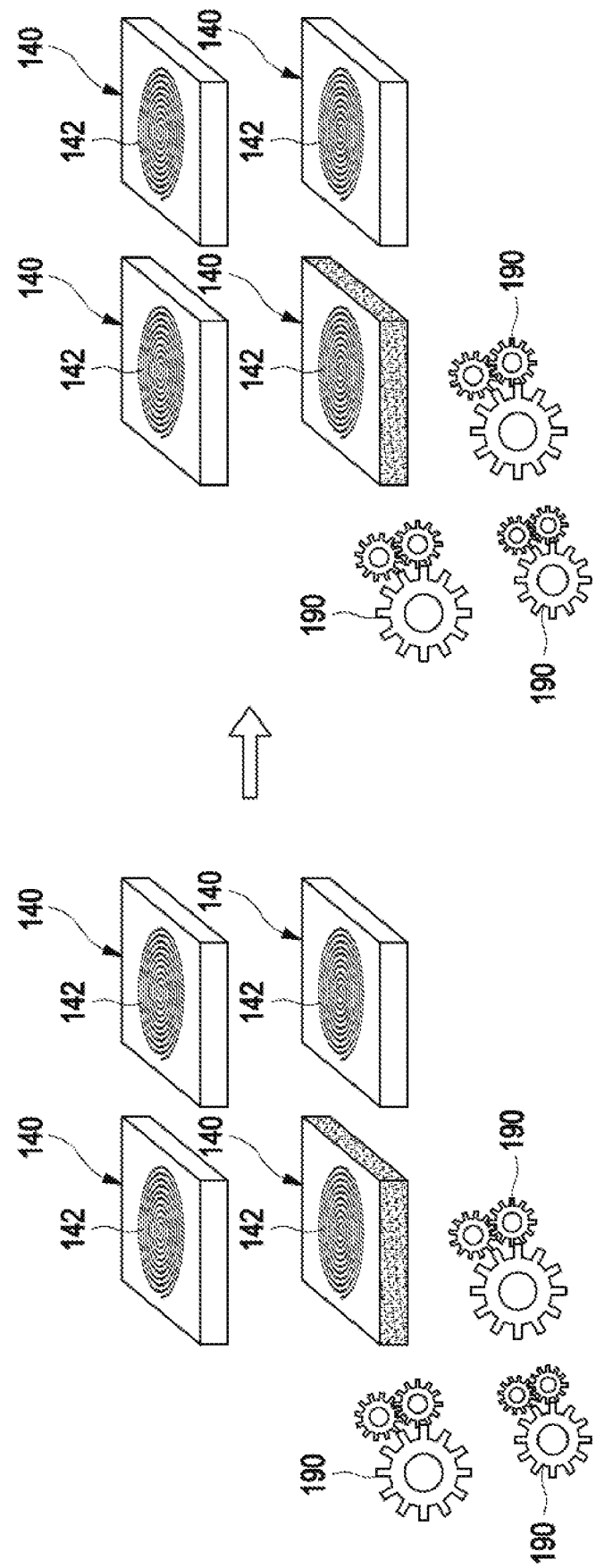
FIG. 7 shows another method for compensating a conductive object in a sensing area of the inductive sensors in accordance with an embodiment of the present disclosure.

FIG. 7 shows another method for compensating a conductive object 190 in a sensing area of the inductive sensors 140. Hereinafter, only the difference from FIG. 6 will be described and like constructional members are indicated by like reference signs. During operation the inductive sensor 140 could be required to work with 190 conductive object present in the proximity of the inductor as shown in the left portion of FIG. 7. By measuring the output value from the inductor 140 while there are no sample container carriers 130 on the transport plane 110, the presence of the conductive object 190 affecting the reading of the inductor 142 can be detected and quantified as shown in the middle portion of FIG. 7. The evaluation unit 170 is configured to compensate the presence of the conductive object 190 in the sensing area of at least one of the inductive sensors 140 as an error if a output signal value of the measured output signal of the respective inductive sensor 140 during absence of a sample container carrier 130 in the sensing area is above a predetermined threshold. With other words if compared to FIG. 6, on the other hand, if the measured disturbance is too high and cannot be handled, the evaluation unit 170 will detect that the respective inductive sensor 140 is performing outside of specifications and can raise an error and avoid using the inductive sensor 140 subjected to external disturbances.

Figure 8:
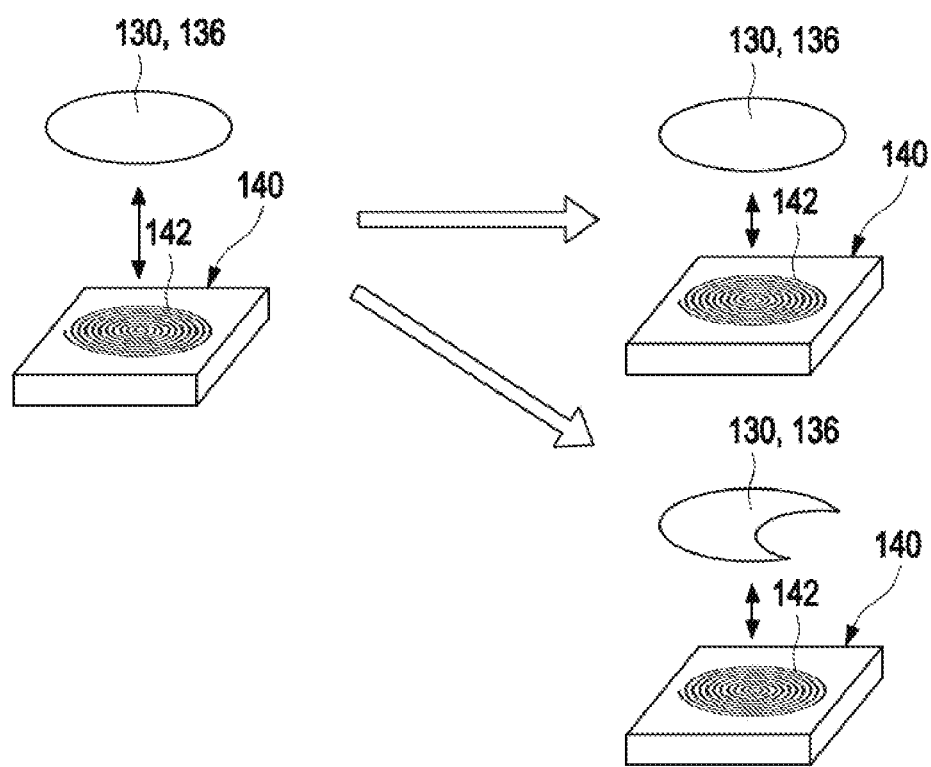
FIG. 8 shows a method for compensating changes of conductive characteristics of a conductive object in a sensing area of the inductive sensors in accordance with an embodiment of the present disclosure.

FIG. 8 shows a method for compensating changes of conductive characteristics of a conductive object 190 in a sensing area of the inductive sensors 140. Merely as an example, a single inductive sensor 140 is shown. The evaluation unit 170 is further configured to detect a change of electrically conductive characteristics of the sample container carriers 130 by periodically measuring a maximum output signal value of the output signals of the inductive sensors 140. Since the calibration as explained above is performed by measuring the maximum value for the reference object, the inductive sensor 140 can detect changes to the sample container carriers 130, caused by wear or damage, by periodically measuring the maximum signal intensity. If the sample container carrier 130 generates a maximum value outside of specification, either the sample container carriers 130 is defected as shown in the right lower portion of FIG. 8 or by wear/tolerances the distance to the inductor 142 of the inductive sensor 140 is outside of specifications as shown in the right upper portion of FIG. 8, the error can be detected. By performing periodically checks, the evaluation unit 170 can monitor changes in the measured values of the sample container carriers 130 over time. Predictive maintenance can be achieved by observing a pattern leading to a sensor reading failure before the failure actually happens.

Hereinafter, the linearization of the output signal of the inductive sensors 140 and the creation of the lookup table will be described in further detail. It has to be noted that FIGS. 9 to 11 also show details of a calibration process.

As mentioned above, the transport plane 110 includes a plurality of inductive sensors 140. Thus, the transport plan 110 may also be called a sensor board. The transport plane 110 defines a two-dimensional plane, hereinafter also called X-Y plane. The array of inductive sensors 140 involves an issue to get an accurate distance in the X-Y plane as without calibration and the linearization algorithm applied by the present disclosure, each inductive sensor 140 provides a different output signal for an actual identical horizontal distance. To solve this problem, a number of steps are involved that lead the current system to provide an improved resolution, such as resolution of ¹/₁₀ mm on a 25 cm×25 cm sensor board with 36 sensing coils (6 along X-axis and 6 along Y-axis).

Figure 9:
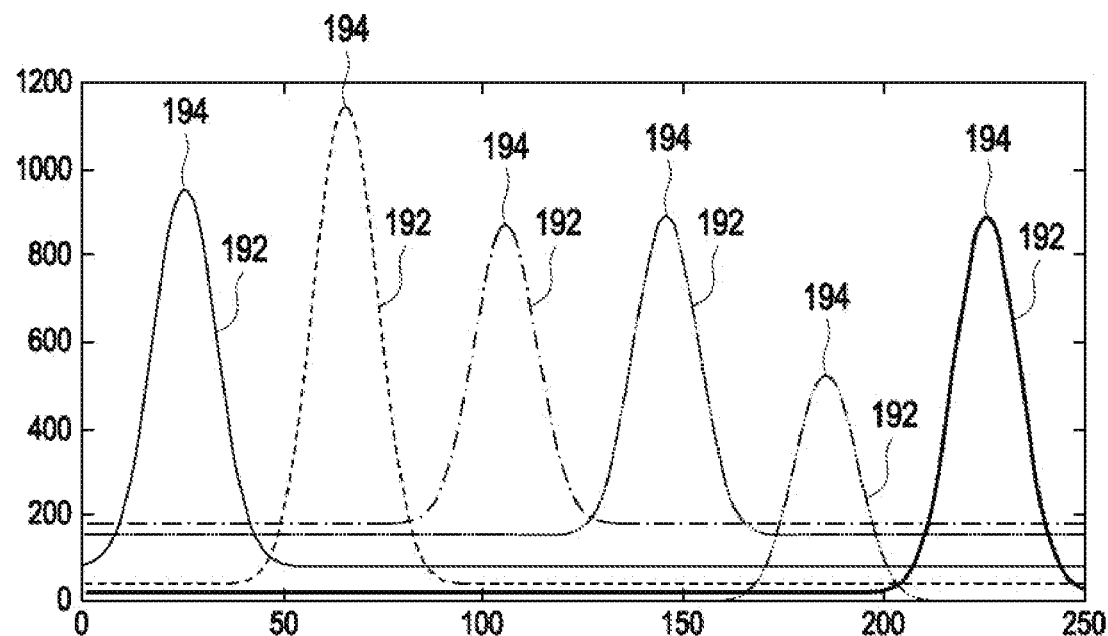
FIG. 9 shows a cross section of output signals of an example of coils of 6 inductive sensors along one axis of the transport plane in accordance with an embodiment of the present disclosure.

FIG. 9 shows a cross section of output signals of an example of coils of 6 inductive sensors 140 along one axis of the transport plane 110. The X-axis represents the length of the transport plane 110 or sensor board along the axis of the cross-section. The Y-axis represents the LDC (Inductance count) of the inductors 142 or sensor coils. Further, output signals 192 of the inductors 142 or coils of the inductive sensors 140, indicated as graphs, are shown and are obtained when a circular metal target such as the reference object 180 or a laboratory sample carrier 130 is moved over them. The peaks 194 of the output signals 192 indicate that the metal target is present over a center of an inductor 142 or coil. For facilitating an understanding, it can be assumed that the metal target is placed and moved over each coil on the X-Y plane of the sensor board. As can be seen in FIG. 9, the output signal 192 of each inductor 142 is at a different minimum value making an evaluation of the respective output signals tricky. For this reason, a so-called offset calibration is made.

Figure 10:
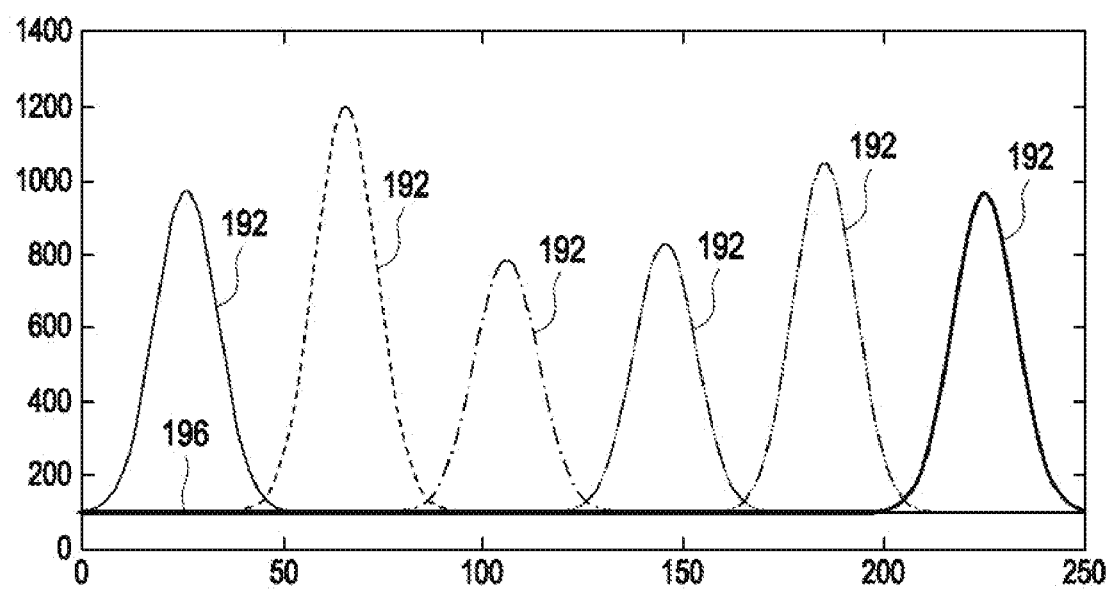
FIG. 10 shows a cross section of output signals of the example of coils of 6 inductive sensors along one axis of the transport plane after offset calibration in accordance with an embodiment of the present disclosure.

FIG. 10 shows a cross section of output signals 192 of the example of coils of 6 inductive sensors 140 along one axis of the transport plane 110 after offset calibration. Hereinafter, only the differences from FIG. 9 are explained and like constructional members or features are indicated by like reference numerals. To get any measurement from the inductors 142 or coils, the inductors 142 or coils are calibrated such that the all coils reveal the same minimum value. In the shown example, the minimum LDC value chosen was 100 but basically any value greater than 0 is fine in order to avoid difficulties caused by signal noise. Thus, in FIG. 10 the offset 196 of the inductors 142 or coils can be seen and the output signals 192 are all at the same base level. In order to create a single look up table for all inductors 142 or coils, subsequently, a so-called scaling calibration is made.

Figure 11:
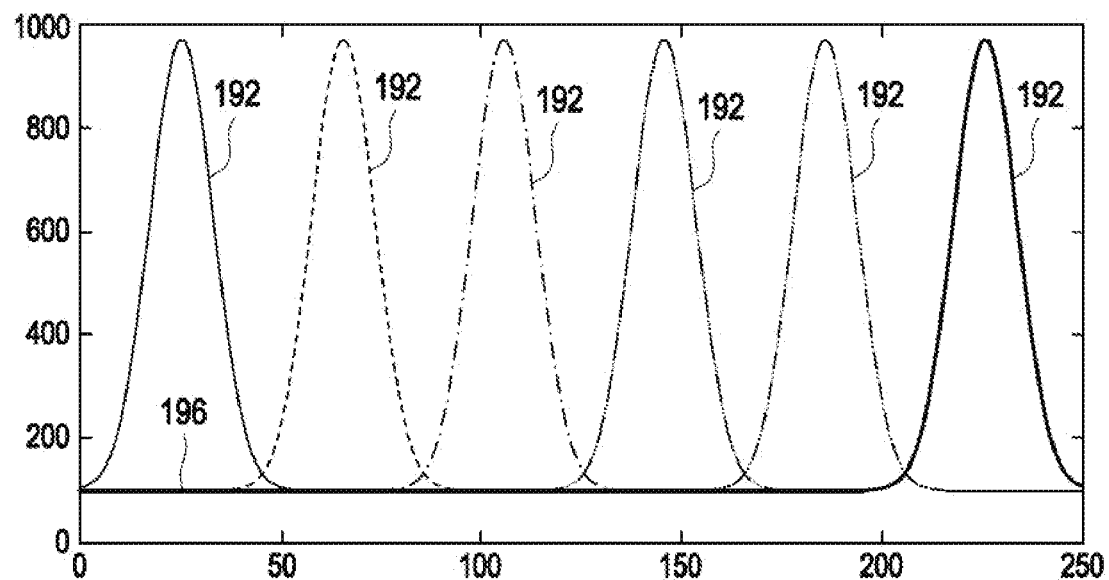
FIG. 11 shows a cross section of output signals of the example of coils of 6 inductive sensors along one axis of the transport plane after scaling calibration in accordance with an embodiment of the present disclosure.

FIG. 11 shows a cross section of output signals 192 of the example of coils of 6 inductive sensors 140 along one axis of the transport plane 110 after scaling calibration. Hereinafter, only the differences from FIG. 10 are explained and like constructional members or features are indicated by like reference numerals. Starting with FIG. 10 where the output signals 192 of all coils are at the same base level, a multiplying factor is applied to the output signals 192 for each coil that can scale the output signal 192 of each coil to a reference value based on a measurement of a reference coil which can be external or internal to the transport plane 110. In the shown example, the multiplying factor is 869 but it can be any number basically based on the characteristics of the coil (e.g., shape of coil) used as reference. This reference is important as a reference look up table is also made from this reference coil. The multiplying factors are saved in a memory such as EEPROM of the sensor board during the calibration process at manufacturing. FIG. 11 shows the normalized coil behaviour responsive to a movement of a metal target after the scaling calibration. After this step, the output signals 192 of the coils are at the same reference offset and scale and the reference lookup table is used to linearize the nonlinear coil response. This reference lookup table is created based on the measurement of the reference coil mentioned above.

Figure 12:
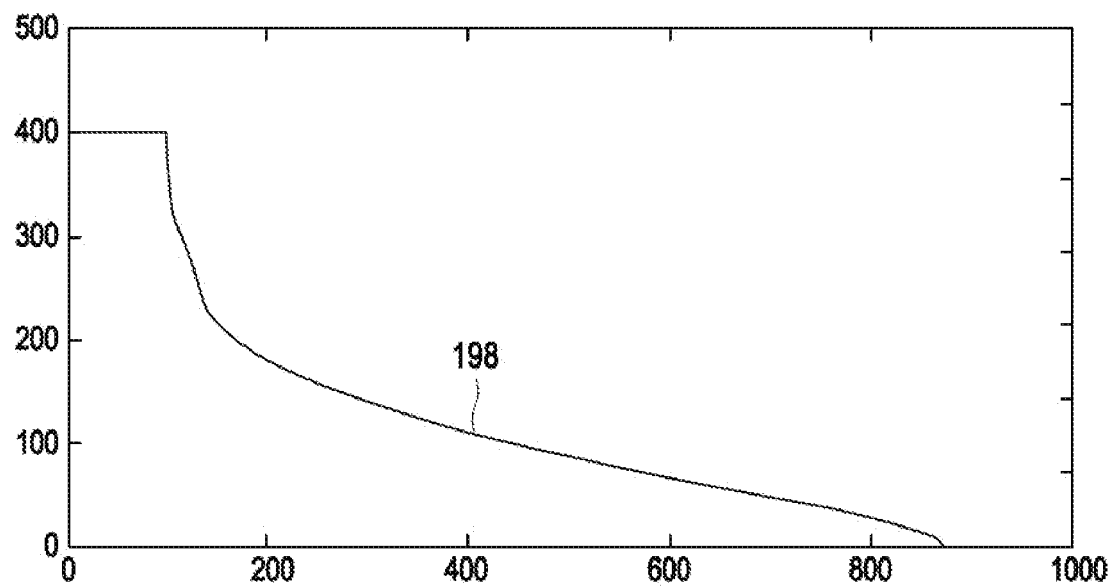
FIG. 12 shows the reference look up table in accordance with an embodiment of the present disclosure.

FIG. 12 shows the reference look up table. The X-axis of the table indicates the LDC count and Y-axis indicates distance value from a center of the inductor 142 or coil given in steps of 0.1 mm. The graph 198 indicates the measurement result of the reference coil. The distance value of 0.1 mm can be calculated or looked from this lookup table for any offset calibrated and scaled calibrated coil. This is valid for any sensor board with similar frequency characteristics. Until unless the hardware is changed drastically, such as change in capacitance or coil design, the look-up table is valid for all the hardware produced within the tolerances. Although the non-linearity of the output signals 192 of the coils does have some influence in accuracy, it was found to be well below 0.1 mm resolution. By means of the look up table, the non-linear output signal of an inductor 142 may be linearized, i.e., converted into a linear graph.

Figure 13:
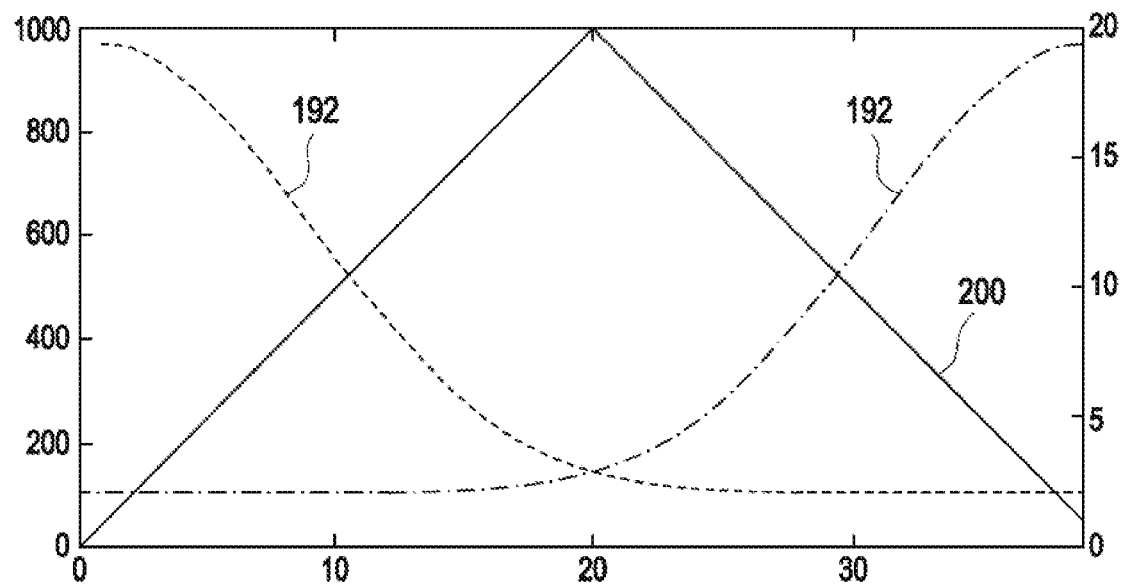
FIG. 13 shows output signals of an example of coils or inductors of inductive sensors along one axis of the transport plane after scaling calibration and the linearized distances in accordance with an embodiment of the present disclosure.
Figure 14:
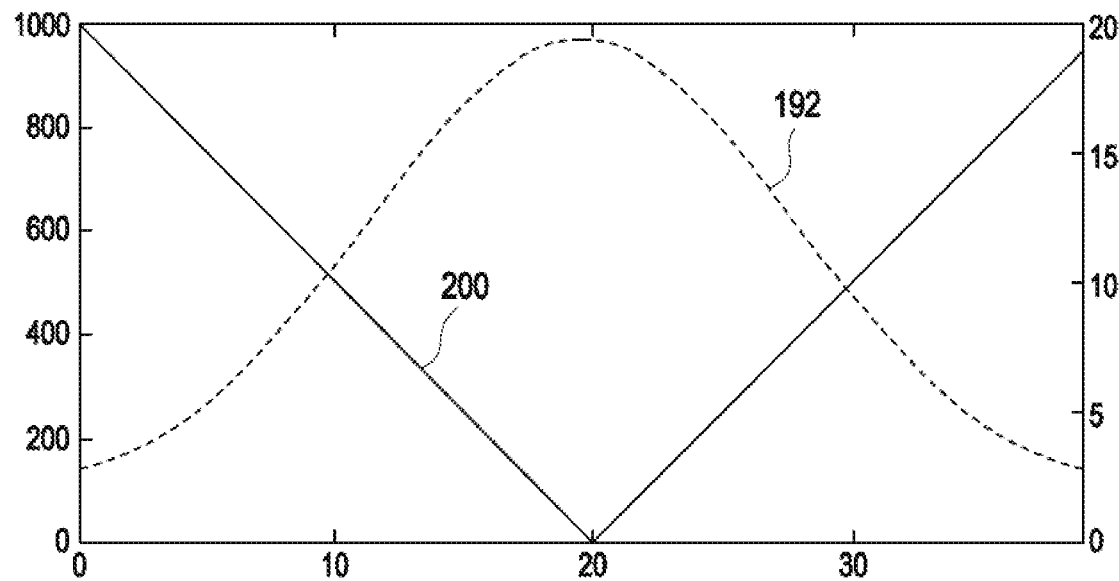
FIG. 14 shows output signals of an example of coils or inductors of inductive sensors along one axis of the transport plane after scaling calibration and the linearized distances in accordance with an embodiment of the present disclosure.

FIGS. 13 and 14 show output signals 192 of an example of coils or inductors 142 of inductive sensors 140 along one axis of the transport plane 110 after scaling calibration and the linearized distances 200. Hereinafter, only the differences from FIG. 10 are explained and like constructional members or features are indicated by like reference numerals. The X-axis represents the length of the transport plane 110 or sensor board along the axis of the transport plane 110. The left Y-axis represents the LDC (Inductance count) of the inductors 142 or sensor coils. The right Y-axis indicates the linearized distance along the axis of the sensor board or transport plane 110. As can be taken from FIGS. 13 and 14, the output signals 192 are at their maximum value when the metal target is at the center of a coil or inductor 142 representing a region of zero cross. Further, the maximum value of the linearized distance 200 is in the middle between the centers of two adjacent coils or inductors 142 representing a region of coil-to-coil cross.

As can be seen from FIGS. 13 and 14, one of the issues with the inductive sensors 140 is the symmetric response of the coil on the X-Y plane in a multi-coil system. It makes the use of such sensors complex and the present disclosure provides a novel solution with minimum variables. To solve this issue, the algorithm for evaluating the output signals 192 uses known information such as a position of the coils on the sensor board or a direction of movement of the metal target on the surface of the sensor board.

Figure 15:
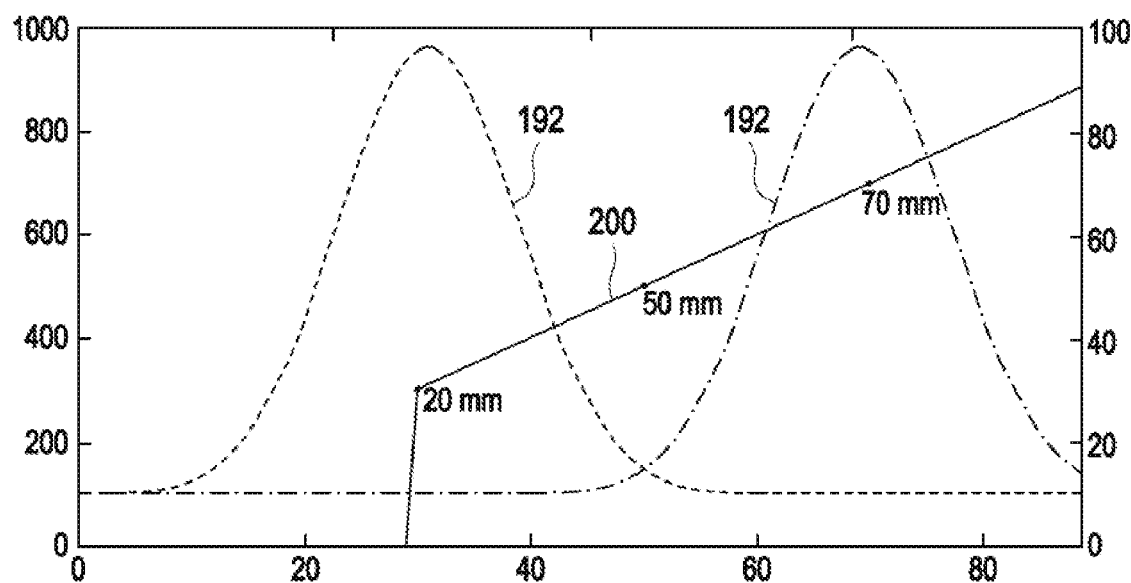
FIG. 15 shows output signals of an example of coils or inductors of inductive sensors along one axis of the transport plane after scaling calibration and the linearized distances in accordance with an embodiment of the present disclosure.

FIG. 15 shows output signals 192 of an example of coils or inductors 142 of inductive sensors 140 along one axis of the transport plane 110 after scaling calibration and the linearized distances 200. Hereinafter, only the differences from FIGS. 13 and 14 are explained and like constructional members or features are indicated by like reference numerals. To explain the linearization algorithm in further detail, an example of two coils or inductors 142 arranged along one axis (X or Y axis) can be assumed. The metal target is at the center of coil 1 and moves towards the coil 2 as shown in FIG. 15. It has to be noted that the direction or way of movement is given by the control unit 160. With other words, the control unit 160 defines a target movement path for the metal target. The coil 1 is located at 30 mm from the border on the sensor board. So the starting position (SP) is 30 mm and as the metal target moves further, the distance from the center of coil 1 is added to the CP (center position) from the lookup-table such as shown in FIG. 12 based on the LDC value (LT[LDC$_{(coilx)}$]). Needless to say, the CP changes when the metal target starts from another coil. For the current design of sensing solution the Coil 1 (i.e., outer Coil at the boarder of the sensing board) is at starting position equal to 30 mm from the edge of the board and the distance is added according to coil number, (i.e., Distance of given coil center to border=Distance of center of outer coil from sensor border+(coil number−1)*distance between centers of two coils). As the distance between adjacent coils is 40 mm for current design sensing solution we can use the above formula to calculate distance from center of coil number 2 to border as 30 mm+(2−1)*40 mm=70 mm. When the metal target is moving from the starting position from the center of coil 1, then the distance from the border of the sensor board is calculated as D=$CP_{(coil\ 1)}$+LT[$LDC_{(coil1)}$]. It has to be noted that this calculation is based on the assumption that a movement of the metal target from coil 1 in the direction towards coil 6 is considered as a positive movement. When the metal target crosses the zone for coil-to-coil crossing (18 mm derived from experiments where it was found that enough signal from second coil is available to make a jump to another coil.), then the algorithm checks for the point when the metal target crosses the coil 1 to coil 2. When the algorithm detects that the metal target has crossed to another coil, then it starts using LDC values of this other coil, i.e., in this example coil number 2. When the algorithm starts using coil 2 LDC values from the lookup table, then the formula for calculating the distance from the border of the sensor changes to D=$CP_{(coil2)}$+LT[$LDC_{(coil2)}$]. Now, when the metal target reaches close to the zero cross zone, the middle of the coil, the algorithm expects the zero crossing point. When the target moves above the zero cross of coil 2, then the algorithm modifies the formula to calculate the distance again to D=$CP_{(coil2)}$ LT[$LDC_{(coil2)}$] using the right side of the output signal 192 of coil 2 as input for the lookup table. This cycle can be continued for the other coils like coil 3 to coil 6. The same algorithm works for all coil pairs along the X-Y plane. This is a way to have a single lookup table for all the coils. FIG. 15 shows the linearization algorithm as graphical form for better understanding. It is also worth noting that the coil coordinates are fixed. Also a lot of filtering steps are not mentioned here for clarification purposes.

The linearization algorithm according to the present disclosure works on the fact that the direction of the movement of the metal target is known. In addition, the starting position and length (in terms of no of logical position) of movement is known. The direction, initial position and length of drive is controlled by the control software of control unit 160 that also takes care of the routing of the target on the driving surface. Particularly, the initial position is known and the presence of the metal target can be detected by checking the LDC value of the coils, i.e., if the LDC value of a coil is above a certain value then this means the metal target is present on the logical position of that coil. Now, the target can be moved in the center of the logical position by blindly centering on the logical position. Now the target is centered on the logical position. The direction and the length of the drive of the target is used in the above-mentioned algorithm. The algorithm only requires information on whether the starting position of the movement is on the zero cross (top of the symmetry) or not as input.

LIST OF REFERENCE NUMBERS 100 laboratory sample distribution system
110 transport plane
120 electro-magnetic actuator
122 ferromagnetic magnetic core
130 sample container carrier
132 sample container
134 magnetically active device
136 electrically conductive member
140 inductive sensor
142 inductor
144 capacitor
146 oscillator
148 demodulator
150 flip-flop
152 output
154 electromagnetic field
156 eddy current
158 magnetic field
160 control unit
170 evaluation unit
180 reference object
182 vertical distance
190 conductive object
192 output signal
194 peak
196 offset
198 graph
200 linearized distance
S10 initialize sensor and get senor value
S12 non-linear sensor values
S14 linearize sensor values with look up table
S16 determine/provide the direction and initial position
S18 select the appropriate path and set the value based on current position
S20 add value of linearized distance from current sensor
S22 is linearized sensor value greater than threshold/distance
S24 change to next sensor inductive coil
S26 is linearized sensor value smaller than threshold/distance and is new value smaller than old value
S28 change to other side of symmetry

What is claimed is:

1. A laboratory sample distribution system, comprising:
a plurality of sample container carriers, each being adapted to carry one or more sample containers, each sample container carrier comprising at least one magnetically active device and at least one electrically conductive member,
a transport plane adapted to support the sample container carriers,
a plurality of electro-magnetic actuators stationary arranged below the transport plane, the electro-magnetic actuators being adapted to move the sample container carriers on top of the transport plane by applying a magnetic force to the sample container carriers,
a plurality of inductive sensors distributed over the transport plane,
a control unit configured to control a movement of the sample container carriers on top of the transport plane using an output signal provided by the inductive sensors by driving the electro-magnetic actuators such that the sample container carriers move along corresponding transport paths, and
an evaluation unit configured to linearize the output signal received from at least one of the inductive sensors by means of a linearization algorithm, wherein the evaluation unit is further configured to determine at least a distance between at least one of the sample container carriers and the at least one of the inductive sensors based on an output signal value of the linearized output signal,
wherein the evaluation unit is further configured to determine a direction of movement of the at least one of the sample container carriers relative to the at least one of the inductive sensors based on at least two different output signal values of the linearized output signal indicating two different distances between the at least one of the sample container carriers and the at least one of the inductive sensors.

2. The laboratory sample distribution system according to claim 1, wherein the evaluation unit is further configured to determine a leaving of a sensing area of one of the inductive sensors by the at least one of the sample container carriers and an approaching of a sensing area of a neighbouring inductive sensor by the at least one of the sample container carriers.

3. The laboratory sample distribution system according to claim 1, wherein the evaluation unit is further configured to track a movement of the at least one of the sample container carriers from a starting position on the transport plane to a final destination on the transport plane.

4. The laboratory sample distribution system according to claim 1, wherein the inductive sensors each comprise at least one inductor and at least one capacitor arranged as a tank circuit.

5. The laboratory sample distribution system according to claim 1, wherein the inductor is arranged below the transport plane.

6. The laboratory sample distribution system according to claim 1, wherein the inductor is arranged parallel to the transport plane.

7. The laboratory sample distribution system according to claim 1, wherein the linearization algorithm includes a look-up table.

8. The laboratory sample distribution system according to claim 7, wherein the look-up table describes an intensity of the output signal for each inductive sensor as a function of a horizontal distance parallel to the transport plane between a reference object and a respective inductive sensor.

9. The laboratory sample distribution system according to claim 1, wherein the evaluation unit is further configured to compensate a presence of a conductive object in a sensing area of at least one of the inductive sensors.

10. The laboratory sample distribution system according to claim 1, wherein the evaluation unit is configured to compensate the presence of a conductive object in a sensing area of at least one of the inductive sensors by measuring the output signal of a respective inductive sensor during absence of a sample container carrier in the sensing area.

11. The laboratory sample distribution system according to claim 1, wherein the evaluation unit is configured to compensate the presence of the conductive object in the sensing area of at least one of the inductive sensors as an offset if an output signal value of the measured output signal of a respective inductive sensor during absence of a sample container carrier in the sensing area is below a predetermined threshold.

12. The laboratory sample distribution system according to claim 10, wherein the evaluation unit is configured to compensate the presence of the conductive object in the sensing area of at least one of the inductive sensors as an error if an output signal value of the measured output signal of a respective inductive sensor during absence of a sample container carrier in the sensing area is above a predetermined threshold.

13. The laboratory sample distribution system according to claim 1, wherein the evaluation unit is further configured to detect a change of electrically conductive characteristics of the sample container carriers by periodically measuring a maximum output signal value of the output signals of the inductive sensors.

14. A method for operating a laboratory sample distribution system according to claim 1, comprising:
 providing a plurality of sample container carriers on the transport plane;
 moving the sample container carriers along corresponding transport paths;
 receiving an output signal from at least one of the inductive inducting sensors;
 linearizing the output signal by means of a linearization algorithm; and
 determining at least a distance between at least one of the sample container carriers and the at least one of the inductive sensors based on an output signal value of the linearized output signal.

15. The laboratory sample distribution system of claim 1 wherein the evaluation unit is configured to determine at least a horizontal distance between the at least one of the sample container carriers and the at least one of the inductive sensors.

* * * * *